US011880821B2

(12) United States Patent
Benkreira et al.

(10) Patent No.: US 11,880,821 B2
(45) **Date of Patent: *Jan. 23, 2024**

(54) SYSTEMS AND METHODS FOR AUTOMATICALLY IDENTIFYING A CHECKOUT WEBPAGE AND INJECTING A VIRTUAL TOKEN

(71) Applicant: Capital One Services, LLC, McLean, VA (US)

(72) Inventors: Abdelkader M'Hamed Benkreira, Washington, DC (US); Jonathan Bodner, Potomac, MD (US); Joshua Edwards, Philadelphia, PA (US); Eric Medin, Fairfax, VA (US); Adam Vukich, Alexandria, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/999,888

(22) Filed: Aug. 21, 2020

(65) Prior Publication Data

US 2020/0380498 A1 Dec. 3, 2020

Related U.S. Application Data

(63) Continuation of application No. 15/950,684, filed on Apr. 11, 2018, now Pat. No. 10,783,516.

(51) Int. Cl.

*G06Q 20/34* (2012.01)
*G06Q 20/12* (2012.01)

(Continued)

(52) U.S. Cl.

CPC ......... *G06Q 20/351* (2013.01); *G06F 40/174* (2020.01); *G06Q 20/12* (2013.01); *H04L 67/02* (2013.01); *H04L 67/306* (2013.01)

(58) Field of Classification Search

CPC ..... G06Q 20/351; G06Q 20/12; G06F 40/174

See application file for complete search history.

(56) References Cited

U.S. PATENT DOCUMENTS 8,380,177 B2 * 2/2013 Laracey ............. G06Q 30/0253 455/414.1
8,799,666 B2 * 8/2014 Kesanupalli ..... G06Q 20/40145 713/180

(Continued)

OTHER PUBLICATIONS

EESR from European Patent Appin. No. 22210456.4 dated Mar. 14, 2023.

Anonymous, HTML DOM URL Property, w3schools.com, Feb. 3, 2023.

*Primary Examiner* — Daniel S Felten

(74) *Attorney, Agent, or Firm* — Greenberg Traurig, LLP

(57) ABSTRACT

A system includes a processing system and a memory system. The processing system includes one or more processors. The memory system includes one or more computer-readable media that contain instructions that, when executed by the processing system, cause the processing system to perform operations. The operations include detecting a loading of a webpage including a document object model (DOM). The operations also include analyzing the DOM to identify a first element in the DOM. The operations also include determining, based on the first element, that the webpage is configured to accept payments. The operations also include receiving, from a provider server, a virtual token which corresponds to a user account. The operations also include injecting information from the virtual token into one or more account number fields on the webpage.

20 Claims, 6 Drawing Sheets

(51) Int. Cl.
*G06F 40/174* (2020.01)
*H04L 67/02* (2022.01)
*H04L 67/306* (2022.01)

(56) References Cited

U.S. PATENT DOCUMENTS 9,129,284 B2 9/2015 Sarkissian et al.
9,135,412 B1* 9/2015 Talvensaari ........... G06F 21/629
9,245,262 B1 1/2016 Avatara
9,330,388 B2* 5/2016 Pitroda .................. G06Q 20/02
9,355,393 B2* 5/2016 Purves ................... G06Q 20/28
9,734,526 B2 8/2017 Isaacson et al.
9,973,374 B1 5/2018 Ratias
10,270,753 B2* 4/2019 Khylkouskaya ...... H04L 9/3228
10,445,737 B2* 10/2019 Beck .................. G06Q 20/4016
10,824,999 B2* 11/2020 Chan .................. G06Q 20/0655
10,896,452 B2* 1/2021 Dominguez ......... G06Q 20/409
11,276,061 B2* 3/2022 Kruse ....................... H04L 9/30
2011/0282753 A1 11/2011 Mullen et al.
2012/0226772 A1* 9/2012 Grube ................. H04L 41/0853 709/217
2013/0227394 A1 8/2013 Sazhin et al.
2014/0281533 A1* 9/2014 de Andrade ...... H04W 12/0608 713/168
2016/0098698 A1 4/2016 Gopalakrishna et al.
2016/0292688 A1 10/2016 Barton et al.
2017/0011440 A1 1/2017 Shauh et al.
2017/0085545 A1* 3/2017 Lohe ...................... G06Q 20/10
2017/0180343 A1* 6/2017 de Ganon ........... G06F 21/6263
2017/0200178 A1 7/2017 Shiffert et al.
2017/0278099 A1* 9/2017 Curry .................. G06Q 20/403
2017/0278174 A1 9/2017 Harrell
2017/0366530 A1* 12/2017 Dominguez ....... G06Q 30/0601
2018/0039611 A1 2/2018 Trivedi et al.
2018/0082283 A1* 3/2018 Sharma .................. G06Q 20/42
2018/0191503 A1* 7/2018 Alwar .................... G06Q 20/10
2018/0225694 A1 8/2018 Shiffert et al.
2018/0234496 A1 8/2018 Ratias
2019/0087402 A1 3/2019 Trivedi et al.
2019/0303500 A1 10/2019 Mathews
2019/0318343 A1* 10/2019 Benkreira .......... G06Q 20/3821

* cited by examiner

200 https://www.myfakesite.com/checkout/onepage/

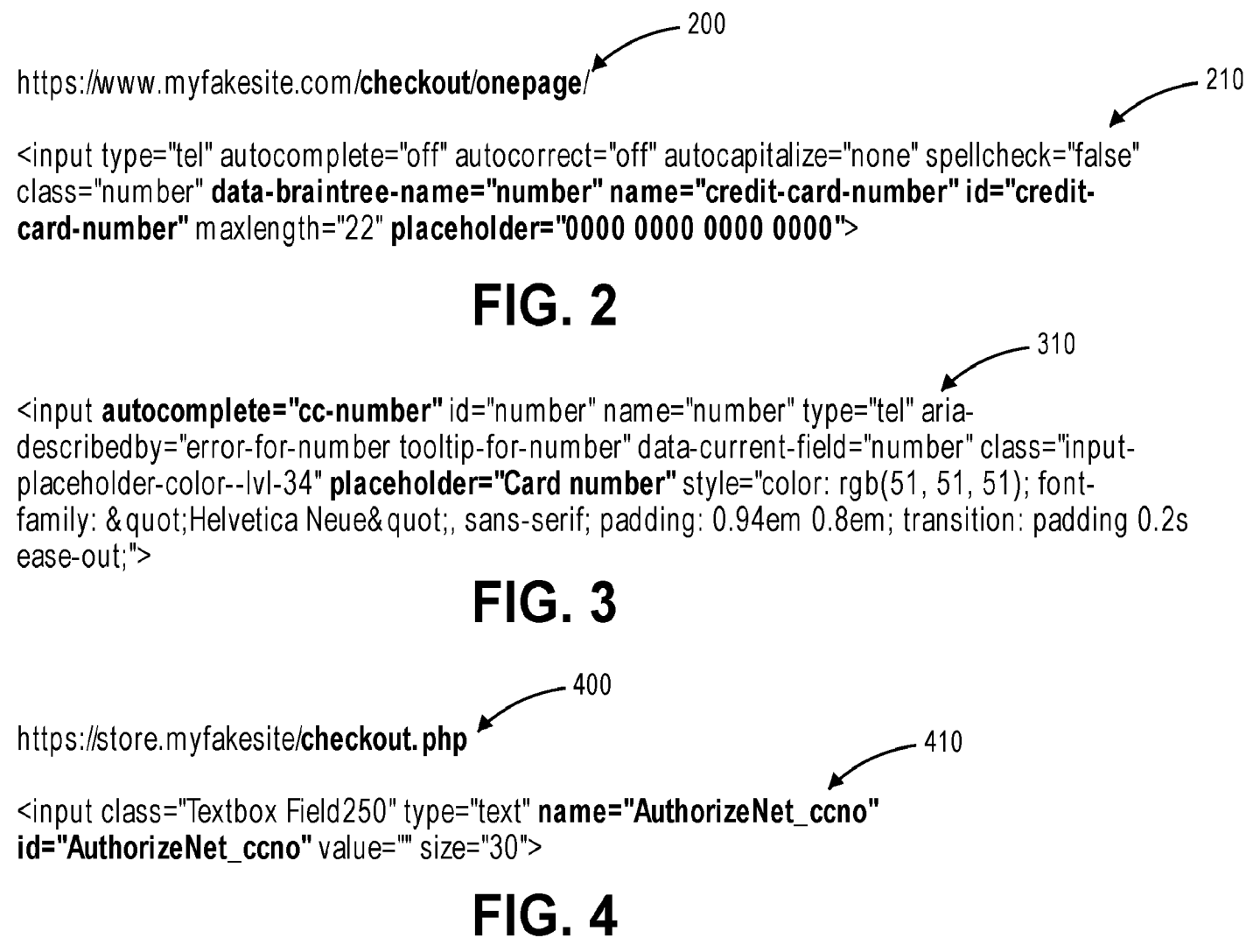

210

<input type="tel" autocomplete="off" autocorrect="off" autocapitalize="none" spellcheck="false" class="number" data-braintree-name="number" name="credit-card-number" id="credit-card-number" maxlength="22" placeholder="0000 0000 0000 0000">

<input autocomplete="cc-number" id="number" name="number" type="tel" aria-describedby="error-for-number tooltip-for-number" data-current-field="number" class="input-placeholder-color--lvl-34" placeholder="Card number" style="color: rgb(51, 51, 51); font-family: "Helvetica Neue", sans-serif; padding: 0.94em 0.8em; transition: padding 0.2s ease-out;">

FIG. 3

400 https://store.myfakesite/checkout.php

410

<input class="Textbox Field250" type="text" name="AuthorizeNet_ccno" id="AuthorizeNet_ccno" value="" size="30">

FIG. 4

SYSTEMS AND METHODS FOR AUTOMATICALLY IDENTIFYING A CHECKOUT WEBPAGE AND INJECTING A VIRTUAL TOKEN

BACKGROUND

When a user navigates to a webpage on the Internet to purchase an item, the user will be directed to a checkout webpage. Traditionally, the user then manually enters the user's information (e.g., name, address, etc.) into fields on the checkout webpage. If the user then navigates to another webpage to purchase another item, the user will then be directed to a different checkout webpage where the user will manually enter the user's information again.

More recently, the user's information may be saved after the user enters and submits the information a first time. Site-specific rules have been created that recognize particular webpages (e.g., particular checkout webpages) and automatically inject the user's saved information into the appropriate fields on these recognized checkout webpages. However, these site-specific rules only work for the particular webpages. In other words, the site-specific rules do not work for webpages that are not recognized. Therefore, it would be desirable to have systems and methods that automatically identify any checkout webpage, whether previously seen (i.e., recognized) or not, and inject the user's information into the appropriate fields.

SUMMARY

A system is disclosed that includes a processing system and a memory system. The processing system includes one or more processors. The memory system includes one or more computer-readable media that contain instructions that, when executed by the processing system, cause the processing system to perform operations. The operations include detecting a loading of a webpage including a document object model (DOM). The operations also include analyzing the DOM to identify a first element in the DOM. The operations also include determining, based on the first element, that the webpage is configured to accept payments. The operations also include receiving, from a provider server, a virtual token which corresponds to a user account. The operations also include injecting information from the virtual token into one or more account number fields on the webpage.

A non-transitory computer-readable medium is also disclosed. The medium stores instructions that, when executed by at least one processor of a computing system, cause the computing system to perform operations. The operations include detecting a loading of a webpage includes a document object model (DOM). The operations also include searching the DOM to identify a first element indicating that the webpage accepts payment information. The operations also include requesting, from a provider server, a virtual token which corresponds to a user account in response to identifying the first element. The operations also include receiving the virtual token from the provider server in response to the requesting. The operations also include automatically placing the virtual token into one or more fields for the payment information in the webpage.

A system for automatically entering payment information is also disclosed. The system includes a processing system and a memory system. The processing system includes one or more processors. The memory system includes one or more computer-readable media that contain instructions that, when executed by the processing system, cause the processing system to perform operations. The operations include receiving a request for a virtual token from a user device. The request is generated based on a determination that the user device has loaded a webpage including a document object model (DOM), and the DOM includes a first element that indicates that the webpage is configured to accept payments. The operations also include generating the virtual token in response to the request. The virtual token corresponds to a user account. The operations also include transmitting the virtual token to the user device. The virtual token is configured to be placed into one or more account number fields on the webpage.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 2 is a diagram illustrating an example uniform resource locator (URL) and a corresponding document object model (DOM), consistent with certain disclosed embodiments;

FIG. 3 is a diagram illustrating another example DOM, consistent with certain disclosed embodiments;

FIG. 4 is a diagram illustrating yet another example URL and a corresponding DOM, consistent with certain disclosed embodiments;

DETAILED DESCRIPTION

Figure 1:
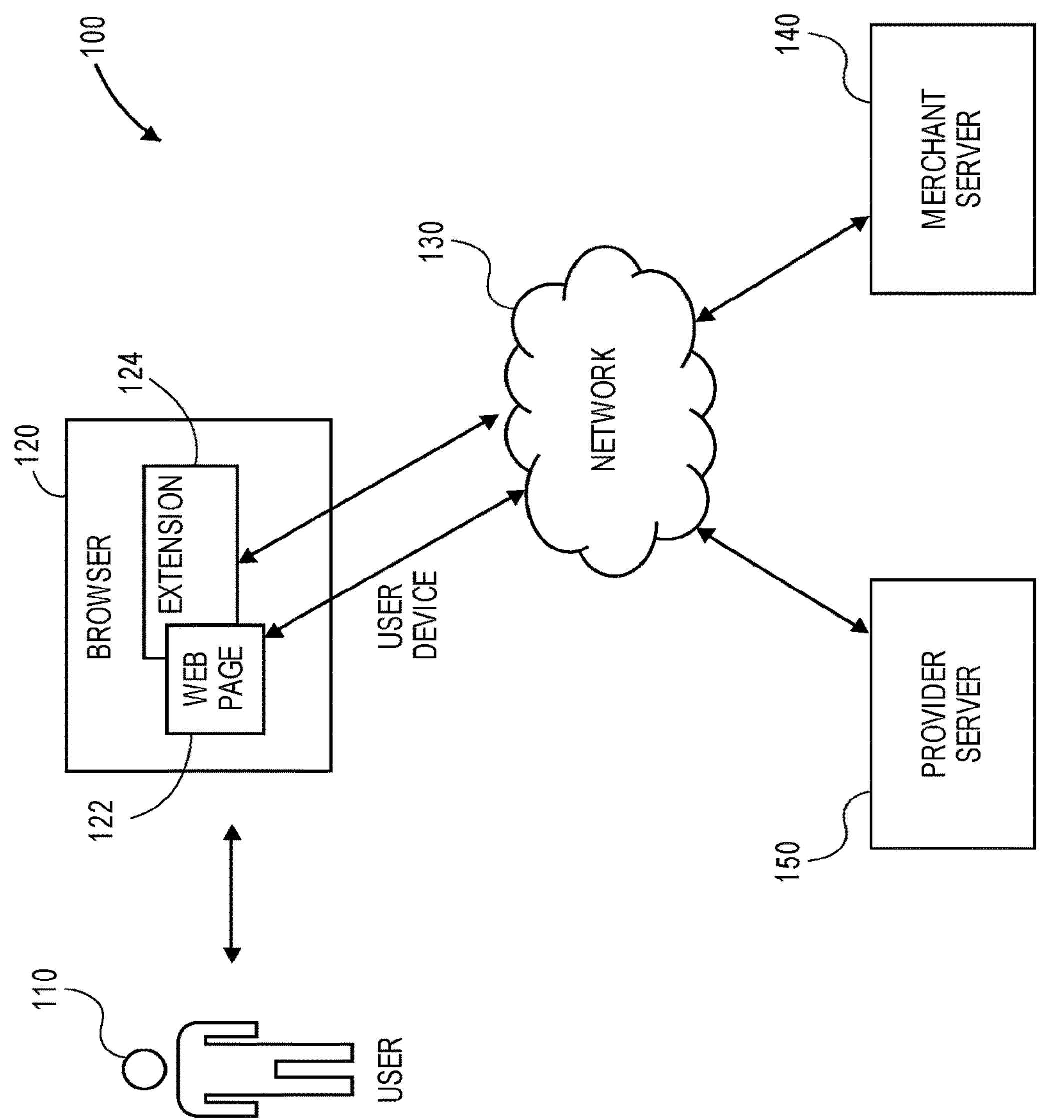
FIG. 1 is a diagram illustrating an example of a system for automatically identifying a checkout webpage and injecting a virtual token, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram illustrating an example of a system 100 for automatically identifying a checkout webpage and injecting a virtual token, consistent with certain disclosed embodiments. As shown in FIG. 1, a user 110 operating on a user device 120 may communicate, through a network 130, with a merchant server 140. The user device 120 may be a computer or a smart phone, and the network 130 may include the Internet, as well as other networks, which may be connected to various systems and devices. The user device 120 may display a webpage generated/provided by the merchant server 140. The webpage may be one that the user 110 and the user device 120 have visited before, or it may be one that the user 110 and the use device 120 have not visited before.

The user 110 may then select one or more items or services on the webpage to purchase. Once the items or services have been selected, the user 110 and the user device 120 may then proceed to a checkout webpage 122 provided by the merchant server 140. The checkout webpage 122 may include a plurality of fields that need to be populated/filled-in with the user's information to complete the purchase. The user information may be or include the user's name, billing address (e.g., name, address, city, state, zip code), credit card number, credit card expiration date, credit card verification value (CCV) number, etc.

In at least one embodiment, the user device 120 may also communicate, through the network 130, with a provider server (also referred to as a backend server) 150. The provider server 150 (or, alternatively, a third party server) may provide the user device 120 with a plug-in or extension 124 that may (e.g., automatically) determine that the user 110 and the user device 120 have reached the checkout webpage 122, without using site-specific rules, as described in greater detail below. In one example, the plug-in or extension 124 may be or include ENO® by CAPITAL ONE®. In response, the plug-in or extension 124 may request a virtual token from the provider server 150, which may generate the virtual token and transmit the virtual token to the user device 120 (e.g., to the plug-in or extension 124). The plug-in or extension 124 may then automatically populate some or all of the fields on the checkout webpage 122 with the information in the virtual token to facilitate the checkout process. As explained in more detail below, the virtual token may be or include a (e.g., new) virtual credit card number that corresponds to the user's pre-existing credit card account. The virtual token may also or instead include the user's name, billing address, expiration date for the virtual credit card number, CCV for the virtual credit card number, bank account number, routing number, etc.

FIG. 2 is a diagram illustrating an example uniform resource locator (URL) 200 and a corresponding document object model (DOM) 210, consistent with certain disclosed embodiments. The URL 200 and/or the DOM 210 may include one or more elements that may indicate that the URL 200 and the DOM 210 are linked to a checkout webpage. More particularly, the elements may be text, words, attributes, tags, field names, naming patterns, styles, numbers, and/or other identifiers that the plug-in or extension 124 recognizes are likely associated with checkout webpages, or otherwise with pages in which the fields may be populated.

In one embodiment, the term "checkout" in the URL 200 may be examples of one such element, and the plug-in or extension 124 may determine that the URL 200 is linked to a checkout webpage in response to identifying this element. In response, the plug-in or extension 124 may search for one or more of the fields that need to be populated with the user's information.

In another embodiment, the element may be a signature of a merchant in the URL 200 or DOM 210 that indicates to the plug-in or extension 124 that the merchant has either built or hosts the webpage linked to the URL 200. For example, the term "onepage" in the URL 200 may be an element, and the plug-in or extension 124 may determine that a third-party tool was used to generate the checkout portion of the DOM 210 in response to this element. In response, the plug-in or extension 124 may search for one or more of the fields that need to be populated with the user's information based at least partially upon one or more other naming patterns of the third-party tool. For example, other naming patterns may be or include a name attribute ending in "_ccno", an attribute called "data-braintree-name" with a value of "number", and id attribute that begins with "recurly", etc.

In another embodiment, a placeholder in the DOM 210 showing a sequence of (e.g., 16-digit) numbers in a format associated with a payment account (e.g., a credit card number) may be an element, and the plug-in or extension 124 may determine that the DOM 210 is linked to a checkout webpage in response to identifying this element. In response, the plug-in or extension 124 may search for one or more of the fields that need to be populated with the user's information.

In another embodiment, a data-braintree-name of "number" in the DOM 210 may be an element, and the plug-in or extension 124 may determine that the DOM 210 is linked to a checkout webpage in response to identifying this element. More particularly, this may indicate that a third-party tool, such as the BRAINTREE® tool, is being used and tagging this as one or more of the fields that need to be populated with the user's information.

In another embodiment, a name and/or id of "credit-card-number" in the DOM 210 may be an element, and the plug-in or extension 124 may determine that the DOM 210 is linked to a checkout webpage in response to identifying this element. More particularly, this may be a custom way that one or more of the fields have been tagged.

FIG. 3 is a diagram illustrating another example DOM 310, consistent with certain disclosed embodiments. The DOM 310 may include one or more elements that may indicate that the DOM 310 is linked to a checkout webpage. In this example, the webpage is determined to be a checkout webpage without analyzing the URL.

In one embodiment, an autocomplete field and/or tag of "cc-number" in the DOM 310 may be an element, and the plug-in or extension 124 may determine that the DOM 310 is linked to a checkout webpage in response to identifying this element. More particularly, this website tag is an example of an element that merchant server 140 can use to inform autocompletion tools to that this is a credit card number. The autocomplete tag is one example of merchant server 140 intentionally informing autocompletion tools, including the plug-in or extension 124, that data can be automatically supplied, but any tags used by merchant server 140 for this purpose could also be applied.

In another embodiment, a placeholder of "card number" in the DOM 310 may be an element, and the plug-in or extension 124 may determine that the DOM 310 is linked to a checkout webpage in response to identifying this element. More particularly, this may be an indication that the merchant server 140 or website creator is indicating to the user 110 that the user 110 should enter his/her credit card number here. This information may be used in conjunction with other elements to confirm that this is a credit card field.

FIG. 4 is a diagram illustrating yet another example URL 400 and a corresponding DOM 410, consistent with certain disclosed embodiments. The URL 400 and/or the DOM 410 may include one or more elements that may indicate that the URL 400 and the DOM 410 are linked to a checkout webpage.

In one embodiment, the term "checkout.php" in the URL 400 may be an element, and the plug-in or extension 124 may determine that the URL 400 is linked to a checkout webpage in response to identifying this element. In another embodiment, a name and/or id in the DOM 410 ending in "_ccno" may be an element, and the plug-in or extension 124 may determine that the DOM 410 is linked to a checkout webpage in response to identifying this element.

Figure 5:
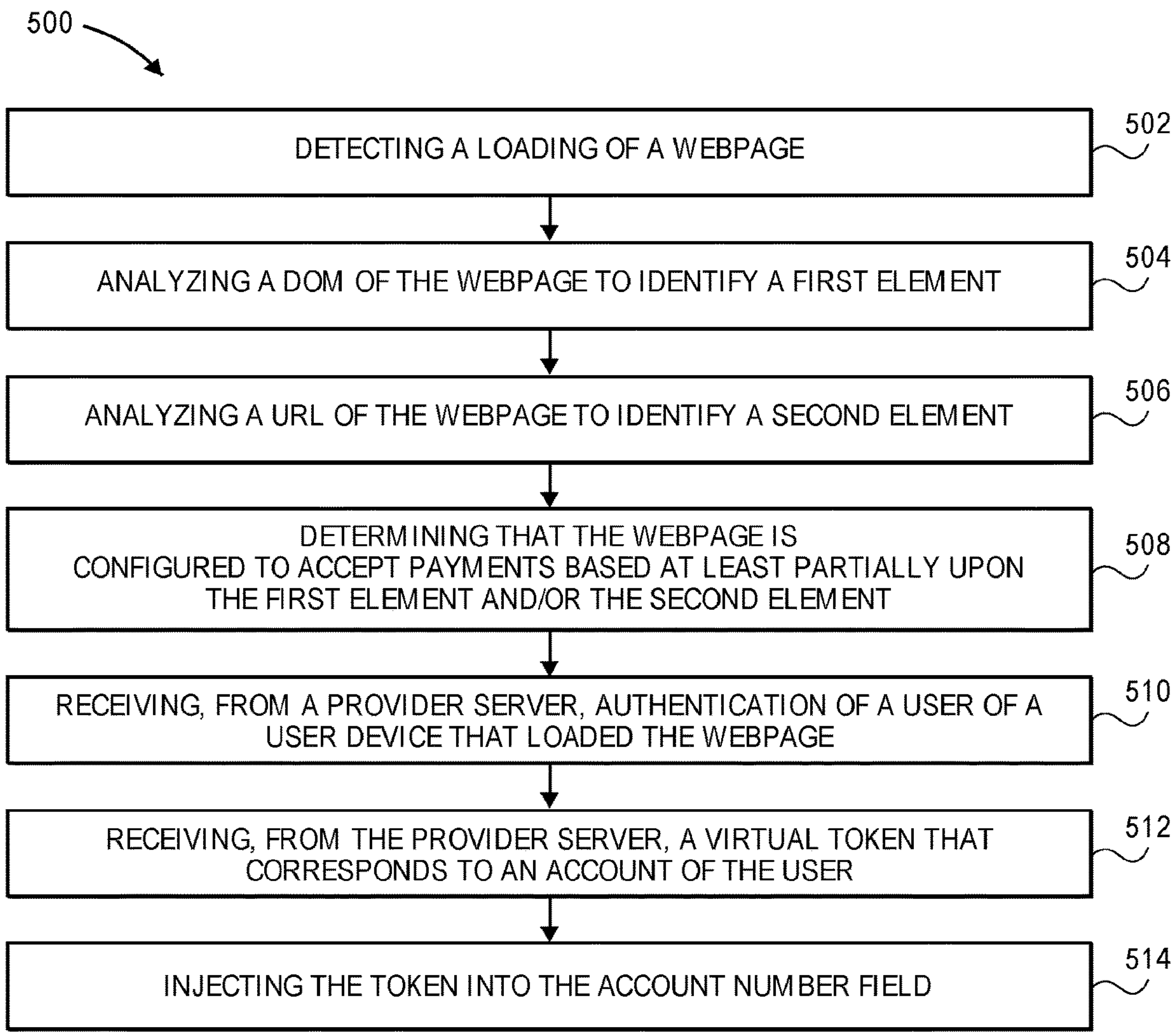
FIG. 5 is a diagram illustrating an example of a flowchart of a method for automatically identifying a checkout webpage and injecting a virtual token, consistent with certain disclosed embodiments.

FIG. 5 is a diagram illustrating an example of a flowchart of a method 500 for automatically identifying a checkout webpage and injecting a virtual token, consistent with certain disclosed embodiments. The method 500 may proceed by operation of the user device 120 e.g., executing the web browser with the plug-in or extension 124.

The method 500 may include detecting a loading of a webpage, as at 502. The webpage may be generated/provided by the merchant server 140 (e.g., via the network 130) and loaded by the user device 120. The loading of the webpage may be detected by the plug-in or extension 124. The webpage may include or otherwise be associated with a URL and a DOM.

The method 500 may also include analyzing/searching the DOM to identify one or more first elements in the DOM, as at 504. The method 500 may also or instead include analyzing/searching the URL to identify one or more second elements in the URL, as at 506. The analysis may include searching through the input fields in the DOM and/or URL to look for certain tags, attributes, names, styles, naming patterns, placeholders, text, numbers, etc. Examples of elements in the DOM and the URL are provided in FIGS. 2-4 and the corresponding description above. In another embodiment, the one or more first elements and/or the one or more second elements may also or instead be tied to any other tag, attribute, etc. on the webpage (e.g., a CCV field) that would increase a confidence that the webpage is a checkout webpage).

The method 500 may also include determining that the webpage is configured to accept payments and/or payment information (i.e., that the webpage is a checkout webpage 122), as at 508. The determination may be made by the user device 120 e.g., executing the web browser with the plug-in or extension 124. The determination that the webpage is configured to accept payments and/or payment information may include determining that the webpage includes an account number field, which may include one or more fields that are configured to be populated/filled-in with the user's payment information, such as the user's name, billing address, credit card number expiration date for the credit card number, CCV for the credit card number, bank account number, routing number, etc.

The determination may be based upon identification of the one or more first elements in the DOM and/or the one or more second elements the URL. In at least one embodiment, the DOM may change or otherwise mutate as the webpage becomes the checkout webpage 122, and the one or more first elements in the DOM may be analyzed/identified before, during, or after the change/mutation to determine that the webpage is configured to accept payments.

In one embodiment, the one or more first elements identified in the DOM may be a primary indicator that the webpage is configured to accept payments, and the one or more second elements identified in the URL may be a secondary indicator that the webpage is configured to accept payments. The secondary indicator may be used to boost a confidence/likelihood (e.g., score) that the webpage is configured to accept payments. For example, the plug-in or extension 124 may generate a first confidence score that the webpage is configured to accept payments after identifying the one or more first elements in the DOM. Identifying one or more second elements in the URL may generate a second confidence score. By way of example and not limitation, a first confidence score may be 80%, and a second confidence score may be 90%.

The user device 130, executing the plug-in or extension 124, may determine that the webpage is configured to accept payments whether the plug-in or extension 124 recognizes the webpage or not. In other words, even if site-specific rules do not exist for the particular checkout webpage 122, the plug-in or extension 124 may still be able to determine that the webpage configured to accept payments and includes a plurality of fields that need to be populated with the user's (e.g., payment) information base at least partially upon the first elements and/or second elements.

The method 500 may also include receiving authentication of an identity of a user 110 of the user device 120, as at 510. The identity of the user may be authenticated by the provider server 150 in response to determining that the webpage is configured to accept payments. More particularly, the plug-in or extension 124 and/or the provider server 150 may cause a browser extension to pop up on a screen of the user device 120, prompting the user 110 to enter information, credentials, etc. to authenticate the user's identity (e.g., to prevent fraudulent use). In another embodiment, the user 110 may stay authenticated after authenticating for the first time. Thus, the browser extension may pop up on the screen of the user device 120 to let the user 110 know that the user 110 is currently already authenticated.

The method 500 may also include (e.g., automatically) receiving a virtual token that corresponds to a (e.g., previously-existing) account of the user 110, as at 512. More particularly, the plug-in or extension 124 on the user device 120 may request the virtual token from the provider server 150 in response to determining that the webpage is configured to accept payments and/or authenticating the identity of the user 110. The provider server 150 may generate the virtual token and transmit the virtual token, which may be received by the plug-in or extension 124 on the user device 120. The virtual token may include information associated with the user 110. In one example, the virtual token may be or include a (e.g., new) virtual credit card number that corresponds to the user's pre-existing credit card account. The virtual token may also or instead include the user's name, billing address, expiration date for the virtual credit card number, CCV for the virtual credit card number, bank account number, routing number, etc.

In at least one embodiment, the virtual token may be merchant-specific, dollar-specific, and/or time-specific. For example, if the user 110 is purchasing an item from Merchant A for $100, the virtual token may be or include a virtual credit card number that can only be used with Merchant A, can only be used to pay up to (but not more than) $100, and/or can only be used within a predetermined time window (e.g., within the next 15 minutes). In another example, taxes and/or shipping fees may be estimated (e.g., by the plug-in or extension 124), and the virtual credit card number may be loaded with a predetermined amount of credit that is sufficient to purchase the item, plus the estimated tax and/or shipping fees. The predetermined amount may, in other embodiments, also include a small buffer amount (e.g., $5) in the even that additional, unforeseen fees are encountered. The virtual token may be used only a single time, or the virtual token may be used multiple times (e.g., to purchase items or services from different webpages, or to purchase items or services from a single webpage multiple times).

This may help to limit or prevent fraudulent use. More particularly, if the virtual credit card number is accessed and/or used by a fraudulent user, the fraudulent user will be limited to the merchant-specific, dollar-specific, and/or time-specific requirements associated with the virtual credit card number. In at least one embodiment, the option to make the purchase merchant-specific, dollar-specific, and/or time-specific may be provided to the user device 120 by the plug-in or extension 124 or by the provider server 150.

The method 500 may also include (e.g., automatically) injecting/placing the virtual token into the account number field, as at 514. As described above, the account number field may include one or more fields that are configured to be populated/filled-in with the user's payment information, such as the user's name, billing address, (e.g., virtual) credit card number expiration date for the (e.g., virtual) credit card number, CCV for the (e.g., virtual) credit card number, bank account number, routing number, etc. As such, step 514 may include injecting/placing some or all of the information in the virtual token into the one or more fields that are configured to be populated/filled-in with the user's payment information as a webpage is rendered for display, or during a time period shortly thereafter. The virtual token may be injected by the plug-in or extension 124 in response to determining that the webpage is configured to accept payments and/or authenticating the identity of the user 110. Thus, the user 110 may not have to click and/or type to enter the information from the virtual token into the account number field on the checkout webpage.

The virtual token may be injected into the account number field simultaneously with the loading of the checkout webpage 122 when the virtual token has been used in a recent history of the user device 120. In another embodiment, the virtual token may be injected into the account number field after the loading of the checkout webpage 122. In at least one embodiment, the information from the virtual token that is injected may be highlighted on the screen of the user device 120 to capture the attention of the user 110 so that the user 110 can acknowledge that it has been injected and/or so that the user 110 can confirm its accuracy.

Figure 6:
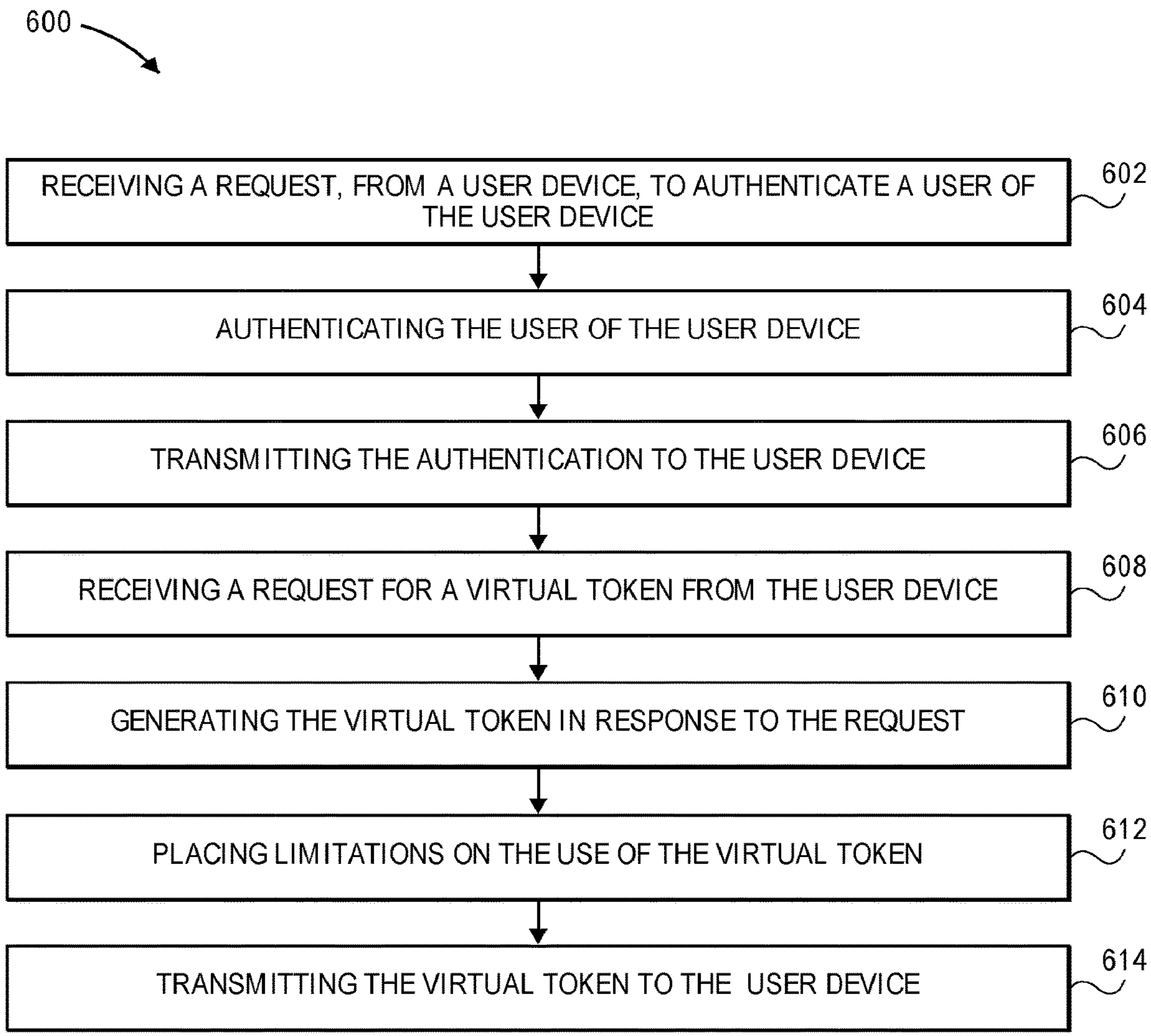
FIG. 6 is a diagram illustrating an example of a flowchart of another method for automatically identifying a checkout webpage and injecting a virtual token, consistent with certain disclosed embodiments.

FIG. 6 is a diagram illustrating an example of a flowchart of another method 600 for automatically identifying a checkout webpage and injecting a virtual token, consistent with certain disclosed embodiments. The method 600 may proceed by operation of the provider server 150.

As discussed above, the user device 120 may have previously loaded a webpage having a corresponding URL and DOM. In response to loading the webpage, the (plug-in or extension 124 on the) user device 120 may determine that the DOM includes a first element that indicates that the webpage is configured to accept payments and/or payment information (i.e., that the webpage is a checkout webpage 122). The (plug-in or extension 124 on the) user device 120 may also or instead determine that the URL includes a second element that indicates that the webpage is configured to accept payments and/or payment information.

In response to determining that the webpage is configured to accept payments and/or payment information, the method 600 may include a provider server 150 receiving a request, from the (plug-in or extension 124 on the) user device 120, to authenticate the user 110 of the user device 120, as at 602. The method 600 may also include the provider server 150 authenticating the user 110 of the user device 120, as at 604. The method 600 may also include the provider server 150 transmitting authentication of the user 110 to the (plug-in or extension 124 on the) user device 120, as at 606.

The method 600 may also include the provider server 150 receiving a request for a virtual token from the (plug-in or extension 124 on the) user device 120, as at 608. The (plug-in or extension 124 on the) user device 120 may transmit the request (at 608 above) to the provider server 150 in response to determining that the webpage is configured to accept payments and/or payment information and/or receiving the authentication of the user 110 from the provider server 150. The request for the virtual token may be received simultaneously with or after the request to authenticate the user 110.

The method 600 may also include the provider server 150 generating the virtual token in response to the request, as at 610. As discussed above, the virtual token may include information associated with the user 110. In one example, the virtual token may be or include a (e.g., new) virtual credit card number that corresponds to the user's pre-existing credit card account. The virtual token may also or instead include the user's name, billing address, expiration date for the virtual credit card number, CCV for the virtual credit card number, etc.

The method 600 may also include the provider server 150 placing limitations on the use of the virtual token, as at 612. The limitations may be merchant-specific, dollar-specific, and/or time-specific, as described above. The limitations may also or instead limit the virtual token to a single use or a predetermined number of multiple uses.

The method 600 may also include the provider server 150 transmitting the virtual token to the (plug-in or extension 124 on the) user device 120, as at 614. The (plug-in or extension 124 on the) user device 120 may then (e.g., automatically) inject/place the virtual token or the information therein into an account number field on the webpage.

Figure 7:
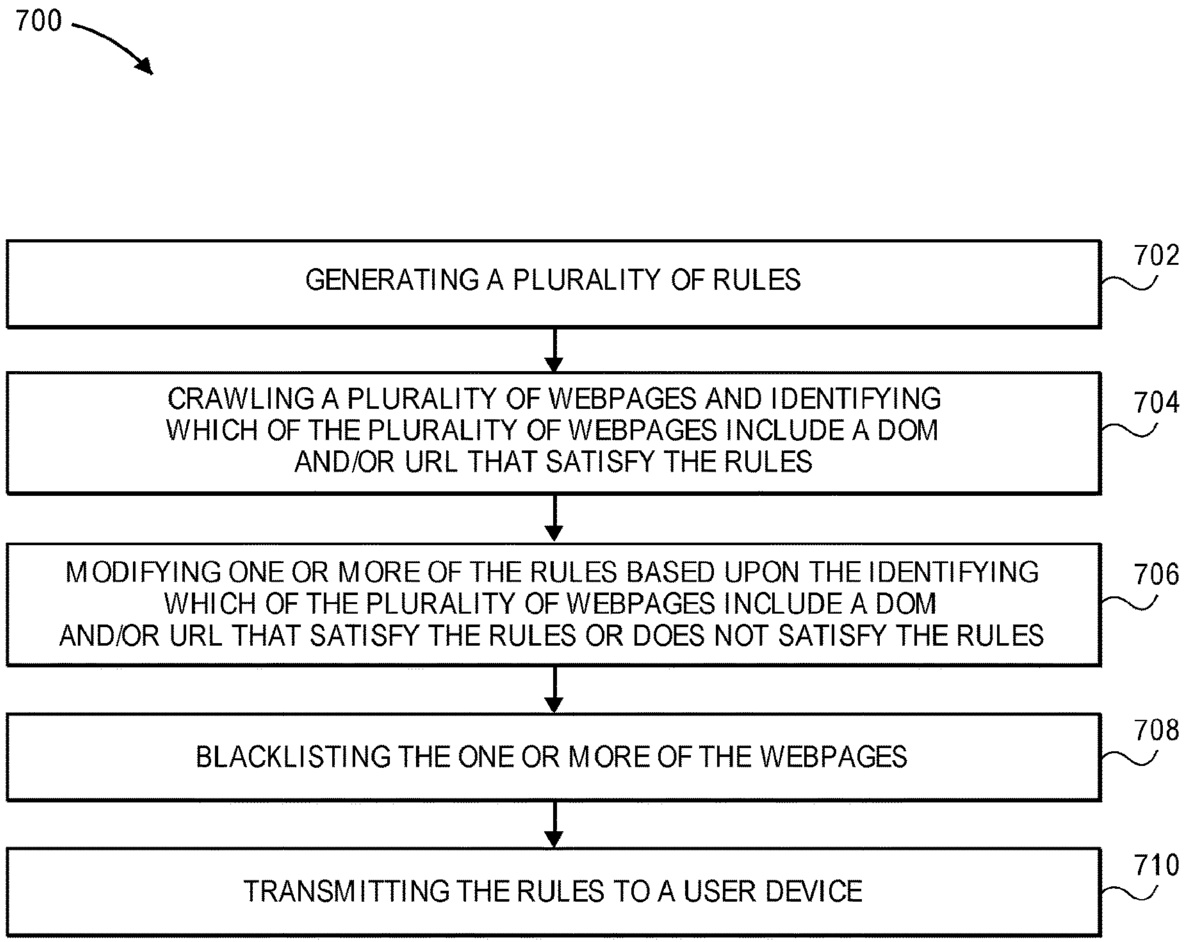
FIG. 7 is a diagram illustrating an example of a flowchart of a method for generating and testing rules.

FIG. 7 is a diagram illustrating an example of a flowchart of a method 700 for generating and testing rules, consistent with certain disclosed embodiments. The method 700 may proceed by operation of the provider server 150. The method 700 may include the provider server 150 generating a plurality of rules, as at 702. The rules may include looking for attributes that match certain naming patterns such as id, name, or autocomplete attributes with values "cardNumber", "creditCardNumber", "card-number", "cc-number", "credit-card-number", etc., third party naming attributes like "data-braintree-name", or URL patterns such as a URL that includes "checkout" or "onepage". These rules are just given as examples, and other rules may include any combination of these values, as well as many others.

The method 700 may also include the provider server 150 crawling a plurality of webpages and identifying which of the plurality of webpages include a DOM and/or URL that satisfies the rules or does not satisfy the rules, as at 704. For example, the provider server 150 may crawl the plurality of webpages and identify which of the plurality of webpages include a DOM and/or URL that is tagged in a manner outlined in the rules. The provider server 150 may do this to validate that the rules will not create false-positives (i.e., indicate a checkout webpage when the webpage is not a checkout webpage) or false-negatives (i.e., indicate not a checkout webpage when the webpage is a checkout webpage).

The method 700 may then also include the provider server 150 modifying one or more of the rules, as at 706. The one or more rules may be modified based upon the identifying which of the plurality of webpages include a DOM and/or URL that satisfies the rules or does not satisfy the rules. For example, the one or more of the rules may be modified in response to identifying false-positives or false-negatives. If one or more of the webpages generate false-positives or false-negatives in response to the crawling at 704 or after the modifying at 706, the method 700 may also include the provider server 150 modifying the one or more rules further or blacklisting the one or more of the webpages, as at 708. Blacklisting may prevent the virtual tokens from being generated for and injected into the particular webpage if a webpage were to create a false-positive without this blacklisting.

The method 700 may also include the provider server 150 transmitting the rules to the (plug-in or extension 124 on the) user device 120. This may include the original rules, the modified rules, and/or the list of blacklisted webpages.

As will be appreciated, the systems 100 and methods 500, 600 described above may improve the process of purchasing an item/service over the Internet. More particularly, the systems 100 and methods 500, 600 may solve the problems of prior computer-based systems related to speed, accuracy, and usability in the context of purchasing an item/service over the Internet. While prior computer-based systems required a user to manually enter the user's credit card information, the systems 100 and methods 500, 600 described above may automatically generate and enter a virtual token including payment information. Automatically entering the virtual token is faster than manually entering credit card information. In addition, automatically entering the virtual token is more accurate than manually entering credit card information because user error (e.g., typos) may be avoided if the user information is entered accurately the first time. Moreover, automatically generating and entering the virtual token is safer than manually entering non-virtual credit card information because the user's actual credit card number is not revealed, which may prevent fraud. Thus, the systems 100 and methods 500, 600 described above are directed to a specific improvement to the way computers operate and provide a specific technologic modification to solve a problem or improve the functioning of a known Internet-payment system.

In addition, the systems 100 and methods 500, 600 described above function differently than conventional autocomplete systems and methods because the systems 100 and methods 500, 600 described above generate new virtual tokens which can include all of the information needed to be entered in place of a physical credit card. This allows the customer to automatically have their payment information inserted without risk of exposure of their physical credit card information. Furthermore, the systems 100 and methods 500, 600 described above distribute computing resources by having the user device 120 perform some of the work/steps, rather than having the provider server 150 perform all of the work/steps.

Figure 8:
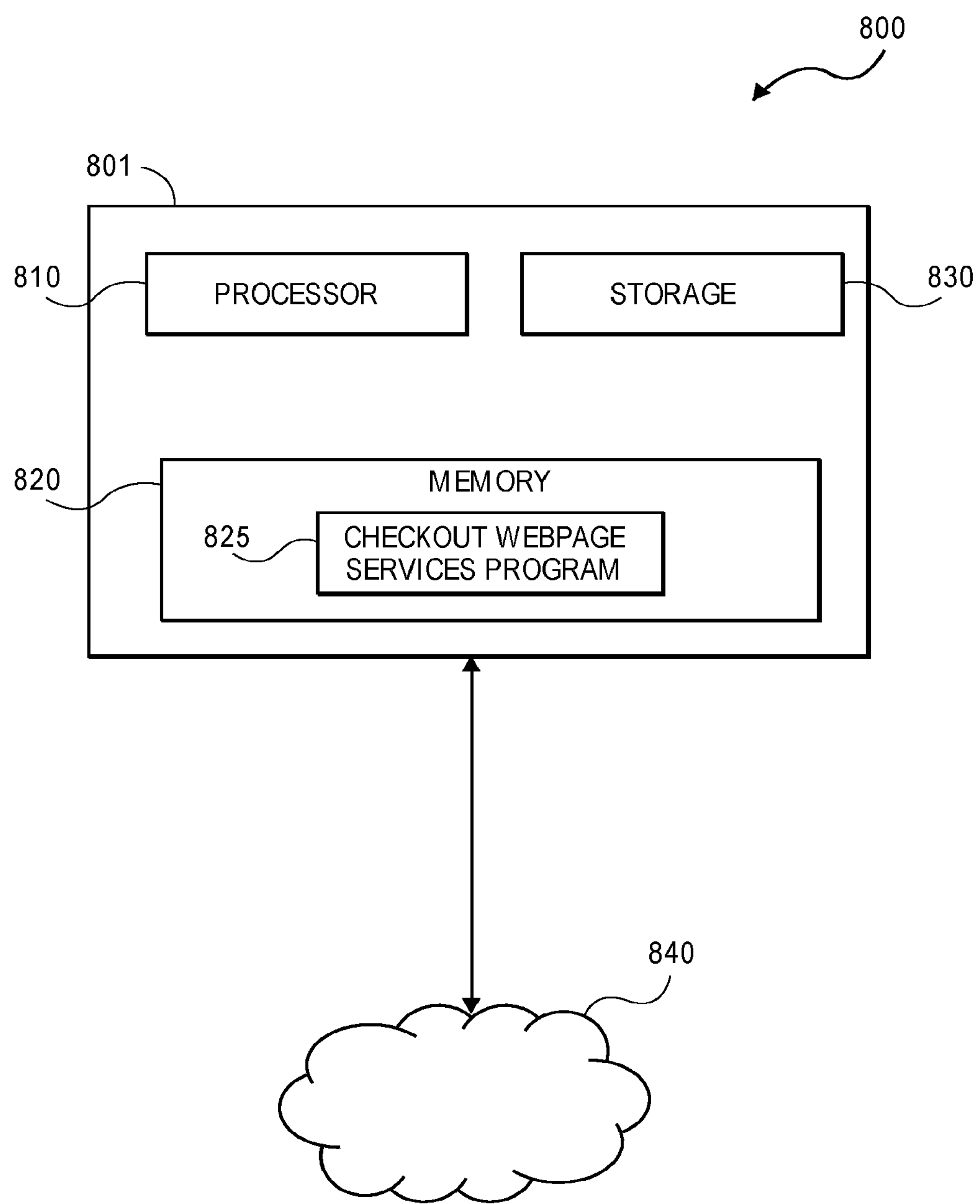
FIG. 8 is a diagram illustrating an example of a hardware system for performing at least a portion of the method disclosed herein, consistent with certain disclosed embodiments.

FIG. 8 is a diagram illustrating an example of a hardware system 800 for performing at least a portion of one or more of the methods 500, 600, 700, consistent with certain disclosed embodiments. The example of a hardware system 800 includes examples of system components that may be used. The components and arrangement, however, may be varied.

As the example of FIG. 8 shows, the hardware system 800 may include a computer 801. The computer 801 may include a processor 810, a memory 820, a storage 830, and input/output (I/O) devices (not pictured). The computer 801 may be implemented in various ways and can be configured to perform any of the embodiments described above. In some embodiments, the computer 801 can be a general-purpose computer such as, for example, a desktop computer, a laptop, a tablet device, a mobile device (e.g., a smartphone), etc. In other embodiments, the computer 801 can be a more capable computing device such as, for example, a data base server, a web server, a mainframe computer, etc. The computer 801 may be standalone or may be part of a subsystem, which may, in turn, be part of a larger system. For example, the computer 801 can be at least a portion of the user device 120 or the provider server 150.

The processor 810 may include one or more known processing devices, such as a microprocessor from the Intel Core™ family manufactured by Intel™, the Phenom™ family manufactured by AMD™, or the like. The memory 820 may include one or more storage devices configured to store information and/or instructions used or executed by the processor 810 to perform certain functions and operations related to the disclosed embodiments. The storage 830 may include a volatile or non-volatile, magnetic, semiconductor, tape, optical, removable, non-removable, or other type of computer-readable medium used as a storage device. In some embodiments, the storage 830 can include or contain, for example, the data received by the user device 120, the merchant server 140, and/or the provider server 150.

In an embodiment, the memory 820 may include one or more programs or subprograms including instructions that may be loaded from the storage 830 or elsewhere that, when executed by the processor 810 of the computer 801, perform various procedures, operations, stages, or processes consistent with disclosed embodiments. For example, the memory 820 may include a checkout webpage services program 825 for performing at least a portion of the methods 500, 600. The memory 820 may also include other programs that perform other functions, operations, and processes, such as programs that provide communication support, Internet access, etc. The checkout webpage services program 825 may be embodied as a single program, or alternatively, may include multiple sub-programs that, when executed, operate together to perform the function of the checkout webpage services program 825 according to disclosed embodiments.

The computer 801 may communicate over a link with a network 840 (e.g., the network 130 in FIG. 1) to, for example, the user device 120, the merchant server 140, and/or the provider server 150. For example, the link may be a direct communication link, a local area network (LAN), a wide area network (WAN), or other suitable connection. The network 840 may include the internet, as well as other networks, which may be connected to various systems and devices.

The computer 801 may include one or more input/output (I/O) devices (not pictured) that allow data (information) to be received and/or transmitted by the computer 801. The I/O devices may also include one or more digital and/or analog communication I/O devices that allow the computer 801 to communicate with other machines and devices. The I/O devices may also include input devices such as a keyboard or a mouse, and may include output devices such as a display or a printer. The computer 801 may receive data (e.g., domain name service requests, registration information, conversations, etc.) from external machines and devices and output data (e.g., domain name services information) to external machines and devices via I/O devices. The configuration and number of input and/or output devices incorporated in I/O devices may vary as appropriate for various embodiments. Example uses of the hardware system 800 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms “including”, “includes”, “having”, “has”, “with”, or variants thereof are used in either the detailed description and the claims, such terms are intended to be inclusive in a manner similar to the term “comprising.” As used herein, the term “one or more of” with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system, comprising:

a provider server, comprising:

a non-transient computer memory storing computer code; and at least one processor executing the computer code stored in the non-transient computer memory by performing operations comprising:

instructing a web browser extension software, running within a web browser application hosted on a user computing device, and searching through a plurality of input fields within a document object model (DOM) of a webpage, a uniform resource locator (URL) of the webpage, or both;

instructing the web browser extension software and determining that the webpage is a payment webpage to accept payments based at least in part on:

at least one first payment-page-indicative tag element in the plurality of input fields of the DOM, at least one second payment-page-indicative element in the plurality of input fields in the URL, and at least one payment-page-indicative confidence score generated from the at least one first payment-page-indicative tag element, the at least one second payment-page-indicative element, or any combination thereof;

instructing, when the webpage is the payment webpage, the web browser extension software and obtaining from at least one payment information tag and at least one user identifying information tag in the plurality of input fields of the DOM, item payment information to purchase at least one item and user identifying information of the user;

receiving, from the web browser extension software, the item payment information and the user identifying information of the user;

estimating at least one additional fee of a predetermined amount based at least in part on the item payment information and the user identifying information that corresponds to at least one user account;

generating a virtual token, for the at least one user account, based at least in part on the item payment information and the at least one additional fee of the predetermined amount; and instructing, the web browser extension software and injecting at least one portion of information of the virtual token into at least one account number field within the plurality of input fields within the DOM.

2. The system according to claim 1, wherein the at least one processor in executing the computer code further performs operations comprising: instructing the web browser extension software and determining that the webpage is the payment webpage by identifying in the plurality of input fields of the DOM, payment-page-indicative tags, attributes, names, styles, naming patterns, placeholders, text, numbers, or any combination thereof.

3. The system according to claim 1, wherein the at least one processor in executing the computer code further performs operations comprising: instructing the web browser extension software and determining that the webpage is the payment webpage when the at least one first payment-page-indicative tag element in the DOM comprises a placeholder corresponding to a 16-digit number.

4. The system according to claim 1, wherein the at least one processor in executing the computer code performs operations comprising the generating of the virtual token by generating a virtual credit card corresponding to the at least one user account; and wherein the virtual credit card comprises a credit card number, an expiration date, and a card verification value.

5. The system according to claim 1, wherein the at least one processor in executing the computer code further performs operations comprising estimating tax and shipping fees to purchase the at least one item; and determining that a predetermined amount of credit is sufficient to purchase the at least one item, the estimated tax and shipping fees, and a predetermined buffer amount.

6. The system according to claim 1, wherein the at least one processor in executing the computer code performs operations comprising instructing the web browser extension software and injecting the at least one portion of the information of the virtual token into the at least one account number field simultaneously with loading the webpage.

7. The system according to claim 1, wherein the at least one processor in executing the computer code performs operations comprising instructing the web browser extension software, saving the virtual token in a recent history of the user computing device, and injecting the at least one portion of the information of the virtual token into the at least one account number field simultaneously with loading the webpage when the virtual token is saved in the recent history.

8. A method, comprising:

instructing, by at least one processor of a provider server, a web browser extension software, running within a web browser application hosted on a user computing device, and searching through a plurality of input fields within a document object model (DOM) of a webpage, a uniform resource locator (URL) of the webpage, or both;

instructing the web browser extension software and determining that the webpage is a payment webpage to accept payments based at least in part on:

at least one first payment-page-indicative tag element in the plurality of input fields of the DOM, at least one second payment-page-indicative element in the plurality of input fields in the URL, and at least one payment-page-indicative confidence score generated from the at least one first payment-page-indicative tag element, the at least one second payment-page-indicative element, or any combination thereof;

instructing, by the at least one processor, when the webpage is the payment webpage, the web browser extension software and obtaining from at least one payment information tag and at least one user identifying information tag in the plurality of input fields of the DOM, item payment information to purchase at least one item and user identifying information of the user;

receiving, by the at least one processor, from the web browser extension software, the item payment information and the user identifying information of the user;

estimating, by the at least one processor, at least one additional fee of a predetermined amount based at least in part on the item payment information and the user identifying information on the item payment information and the user identifying information that corresponds to at least one user account;

generating, by the at least one processor, a virtual token for the at least one user account, based at least in part on the item payment information and the at least one additional fee of the predetermined amount; and instructing, by the at least one processor, the web browser extension software, and injecting at least one portion of information of the virtual token into at least one account number field within the plurality of input fields within the DOM.

9. The method according to claim 8, wherein the instructing the web browser extension software and determining that the webpage is the payment webpage comprises instructing the web browser extension software and identifying in the plurality of input fields in the DOM, payment-page-indicative tags, attributes, names, styles, naming patterns, placeholders, text, numbers, or any combination thereof.

10. The method according to claim 8, wherein the instructing the web browser extension software and determining that the webpage is the payment webpage when the at least one first payment-page-indicative tag element in the DOM comprises a placeholder corresponding to a 16-digit number.

11. The method according to claim 8, wherein the generating of the virtual token comprises generating a virtual credit card corresponding to the at least one user account; and wherein the virtual credit card comprises a credit card number, an expiration date, and a card verification value.

12. The method according to claim 8, further comprising determining, by the at least one processor, that the virtual token, valid for a single time use, was used in a transaction, and deactivating, by the at least one processor, the virtual token for further usage.

13. The method according to claim 8, wherein the instructing of the web browser extension software and injecting the at least one portion of the information of the virtual token into the at least one account number field comprises instructing the web browser extension software and injecting the at least one portion of the information of the virtual token into the at least one account number field simultaneously with loading the webpage.

14. The method according to claim 8, further comprising instructing, by the at least one processor, the web browser extension software and saving the virtual token in a recent history of the user computing device; and wherein the instructing of the web browser extension software and injecting the at least one portion of the information of the virtual token into the at least one account number field comprises instructing the web browser extension software and injecting the at least one portion of the information of the virtual token into the at least one account number field simultaneously with a loading of the webpage when the virtual token is saved in the recent history.

15. The method according to claim 8, wherein the instructing of the web browser extension software and injecting the at least one portion of the information of the virtual token into the at least one account number field comprises instructing the web browser extension software and injecting the at least one portion of the information of the virtual token into the at least one account number field after loading the webpage.

16. The method according to claim 8, further comprising transmitting, by the at least one processor, to the web browser extension software, a plurality of payment-page-identification rules; and wherein the instructing of the web browser extension software for determining whether the webpage is the payment webpage is based at least in part on the plurality of payment-page-identification rules.

17. The method according to claim 8, further comprising estimating, by the at least one processor, tax and shipping fees to purchase the at least one item; and determining, by the at least one processor, that a predetermined amount of credit is sufficient to purchase the at least one item, the estimated tax and shipping fees, and a predetermined buffer amount.

18. The system according to claim 1, wherein the at least one processor in executing the computer code performs operations comprising determining that the virtual token, valid for a single time use, was used in a transaction, and deactivating, by the at least one processor, the virtual token for further usage.

19. The system according to claim 1, wherein the at least one processor in executing the computer code performs operations comprising the instructing of the web browser extension software and injecting the at least one portion of the information of the virtual token into the at least one account number field by instructing the web browser extension software and injecting the at least one portion of the information of the virtual token into the at least one account number field after loading the webpage.

20. The system according to claim 1, wherein the at least one processor in executing the computer code performs operations comprising: transmitting to the web browser extension software, a plurality of payment-page-identification rules; and the instructing of the web browser extension software for determining whether the webpage is the payment webpage is based at least in part on the plurality of payment-page-identification rules.

* * * * *